United States Patent [19]

Kain

[11] Patent Number: 5,261,278

[45] Date of Patent: Nov. 16, 1993

[54] MICROWAVE ACCELERATION TRANSDUCER

[76] Inventor: Aron Z. Kain, 1450 Shenandoah St., Los Angeles, Calif. 90035

[21] Appl. No.: 778,290

[22] Filed: Oct. 17, 1991

[51] Int. Cl.$^5$ .............................................. G01P 15/08
[52] U.S. Cl. .................................. 73/517 R; 324/636
[58] Field of Search .................. 73/517 R, 517 B; 324/635, 636

[56] References Cited

U.S. PATENT DOCUMENTS

| | | | |
|---|---|---|---|
| 3,013,230 | 12/1961 | Simkovich | 333/83 |
| 3,066,267 | 11/1962 | Menhennett | 333/83 |
| 3,636,752 | 1/1972 | Ishii | 73/517 R |
| 3,909,713 | 9/1975 | Billeter | 324/636 |

OTHER PUBLICATIONS

George Von Vick, "Accelerometers", Instruments & Control Systems, vol. 38, pp. 86 and 87, Nov. 1965.
Blair et al. "Microwave Non-Contacting Accelerometer For Gravity Wave Antenna", IEEE Trans. vol. Mag 13, No. 1, Jan., 1977, pp. 350–353.
Jackson, *Classical Electrodynamics*, Ch. 8 pp. 235–267, 1962 Ed.
Blair, "Superconducting Accelerometer Using Niobium-On-Sapphire RF Resonator", Rev. Sci. Instr. 50(3) pp. 286–291, May, 1979.
W. C. Oelfke, et al., "Operation Of An Ultrasensitive Superconducting Accelerometer", IEEE Trans. vol. Mag 17, No. 1, Jan., 1981, pp. 853–854.

*Primary Examiner*—John E. Chapman
*Attorney, Agent, or Firm*—Gottlieb, Rackman & Reisman

[57] ABSTRACT

A microwave resonant cavity contains a dielectric resonator whose normal RF electromagnetic modes are varied by displacement of a probe. Acceleration of the cavity displaces the probe. The acceleration vector or displacement vector is determined by the variation in preselected discrete modes. The device also may be used to accurately measure pressure where the displacement of the probe is caused by flexing of a pressure responsive membrane.

4 Claims, 6 Drawing Sheets

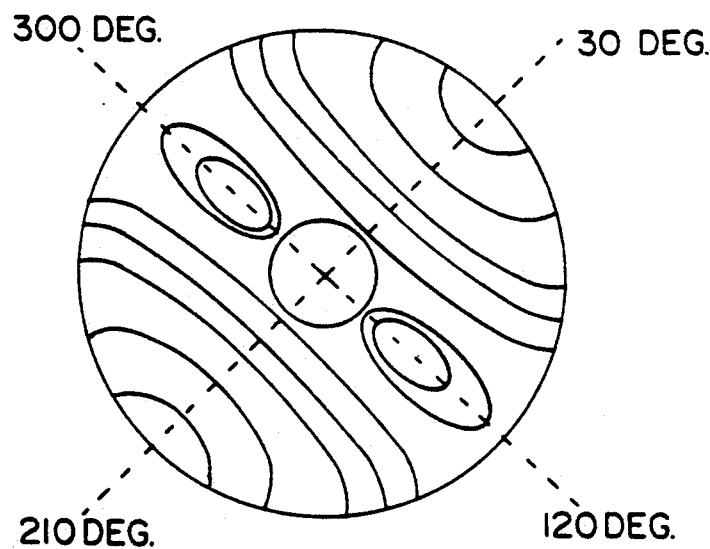
FIG. 4a
FIG. 4b
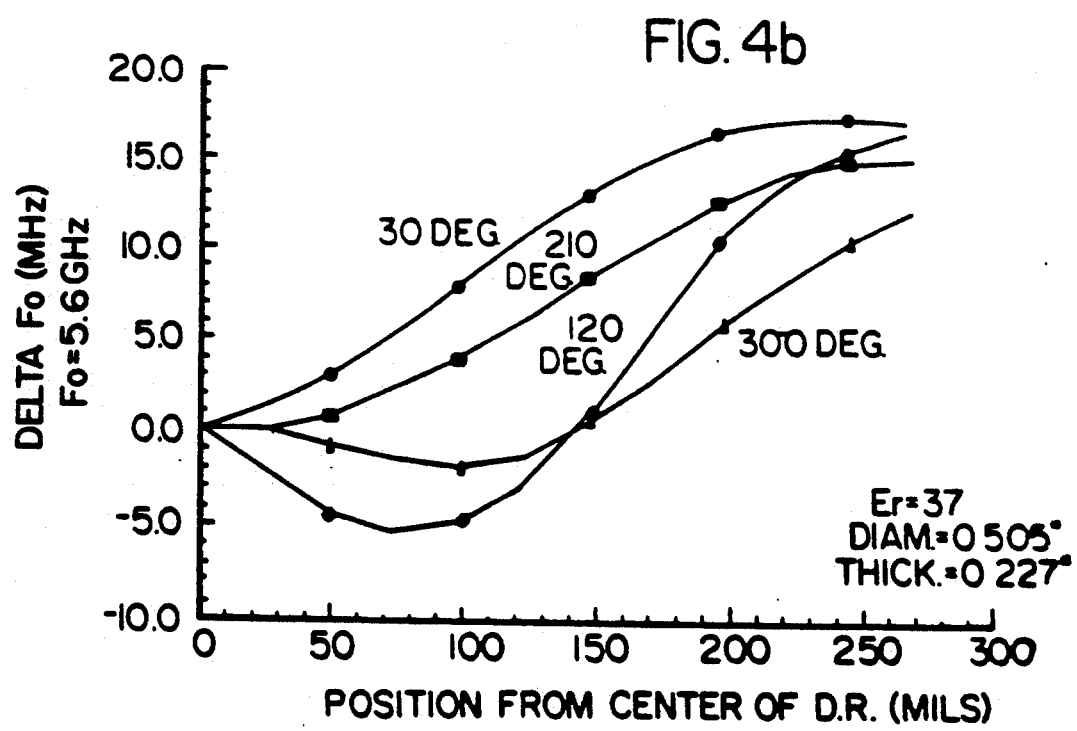

MICROWAVE ACCELERATION TRANSDUCER

BACKGROUND OF THE INVENTION

This invention relates to transducers to produce signals indicative of the displacement or motion of a mechanically deflecting member. In particular, the invention has use (a) as an accelerometer where the deflection of the deflecting member is caused by an acceleration or (b) as a pressure transducer where deflection is caused by response to a pressure change. The invention further relates to microwave resonant structures in which modifications of normal modes of the electromagnetic microwave field is used to detect motion of a component of the apparatus.

It is well known that the perturbation of the electromagnetic fields contained within a resonant structure will produce a corresponding change in the resonant frequency of the structure's electromagnetic normal modes. U.S. Pat. No. 3,636,752 to Ishii, for example, disclosed a microwave acceleration sensor which employed a microwave cavity resonator having a ferrite rod that was stressed in response to the component of an acceleration along the axis of the rod. Because of the nature of the ferrite, the stresses induced changes in the electromagnetic field within the ferrite due to changes in the electromagnetic permeability of the ferrite. The device was capable of measuring only one component of its acceleration. Apparently, multiple devices would be necessary to determine the complete acceleration vector.

U.S. Pat. No. 3,909,713 to Billetes measured the displacement of a test specimen which functioned as the inner conductor of a coaxial cavity resonator. The test specimen was fixed to a moveable wall of the resonator so that deformation of the specimen varied the dimensions of the resonator cavity. The change in resonant frequency in two different electromagnetic modes were detected, which corresponded to detection of changes in the diameter and axial dimension of the cavity. Vibration transducers have also been fashioned by having one surface of a wave guide cavity undergo the vibration that is to be measured. These devices each required the deformation of the overall dimensions of the cavity in order to function.

The U.S. Pat. No. 3,066,267 to Menhennett is also relevant to prior knowledge of the relationship between the electrical size of a cavity and the frequencies of various electromagnetic modes. The general theory may also be found in standard text such as Jackson, "Classical Electrodynamics" Ch. 8, pp. 235–67, 1962 Ed.

Acceleration measurement using microwave detection of overall cavity dimension variation has also been reported in attempts to detect gravity waves generated by, for example, supernovas. See, for example, Blair, et al., "Microwave Non-Contacting Accelerometer For Gravity Wave Antenna". IEEE Trans. Vol. Mag-13, No. 1, Jan. 1971. An ultra-sensitive superconducting accelerometer has been described where a displacement of a mass along a single axis of motion increases the capacitance in an electromagnetic resonant circuit formed of high Q superconducting resonant cavities. See "Operation Of An Ultrasensitive Superconducting Accelerometer", IEEE Trans. Vol. Mag.-17, No. 1, Jan., 1981, and "Superconducting Accelerometer Using Niobium-On-Sapphire RF Resonator", Rev. Sci. Instrum. 50(3) pp. 286–91 May, 1979.

The foregoing systems are all characterized as capable of providing displacement and acceleration transducers that are limited either by requiring that the resonant cavity itself is deformed by the displacement or acceleration that is to be measured, or that are limited by in general being capable of measuring only one component of the vector displacement or acceleration of interest.

BRIEF DESCRIPTION OF THE INVENTION

The present invention employs an electrically hollow cavity having a dielectric resonator within the cavity. Discrete resonant modes of the dielectric resonator are excited. These modes are chosen to provide sufficient information to determine several vector components of the displacement of an object placed near the resonator. The configuration of the resonator cavity and the location of the dielectric resonator within the cavity are not required to change during operation of the device.

If the displacement of the object is caused by the deflection of a bending member under the influence of an acceleration then the resulting change in resonant frequency of the modes is proportional to the acceleration and the entire acceleration vector ma be determined. It is the relationship between the deflection of the bending member and the resulting modes' resonant frequency that forms the basis for use of the transducer as a vector accelerometer, i.e. an accelerometer that is capable of determining more than one component of the acceleration vector. This eliminates the need for multiple accelerometers to be aligned in mutually orthogonal orientations.

This invention provides in one embodiment a device for monitoring the changes in resonant frequency in a microwave resonator in direct response to changes in acceleration (or in another embodiment changes in deflection) of a deflecting member housed within the overall structure.

It is an object of this invention to allow the displacement or acceleration to be directly monitored as a vector quantity as a result of the change in frequency and rate of change in frequency of resonant modes.

It is a further object of this invention to enable one such accelerometer to fully characterize the sensed acceleration in three dimensions, as opposed to requiring three orthogonally placed accelerometers to characterize the acceleration.

Another object of this invention is to provide an accelerometer that can be manufactured at a fraction of the cost of conventional accelerometers.

The above mentioned objects of this invention and other features will be more evident by reference to the following description in accordance to the accompanying drawings, in which:

FIG. 1b is a plan view of the major components of the accelerometer with corresponding numerals of reference as in FIG. 1a.

FIG. 2b is a magnitude plot of the change in frequency associated with the mode in FIG. 2a.

FIG. 3b is a magnitude plot of the change in frequency associated with the mode in FIG. 3a.

FIG. 4a is a contour plot of yet another different resonant mode associated with this accelerometer.

FIG. 4b is a magnitude plot of the change in frequency associated with the mode in FIG. 4a.

DETAILED DESCRIPTION OF A PREFERRED EMBODIMENT

Figure 1A:
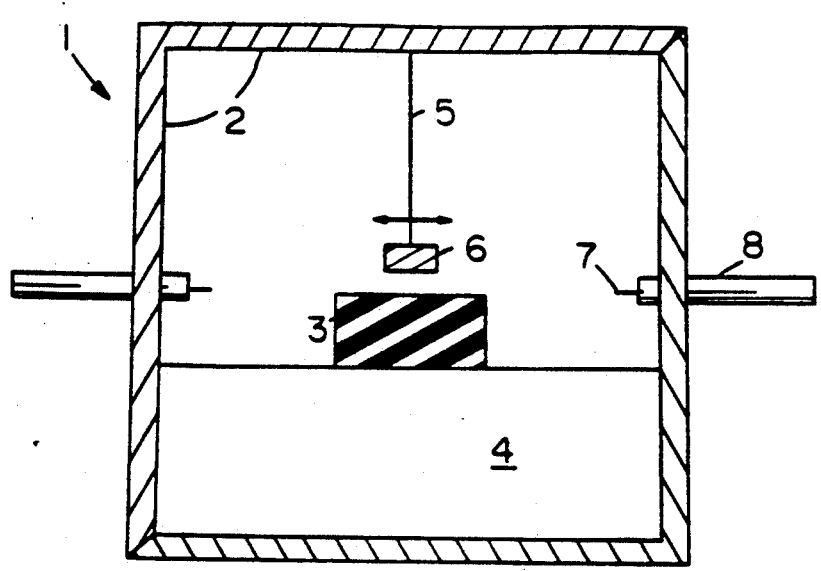
FIG. 1a is a cross-sectional view through the resonant cavity which indicates the major components of the preferred embodiment of the accelerometer design.

Referring to FIG. 1a and b by numerals of reference, 1 denotes an accelerometer consisting of a metallic cylindrical cavity 2. Contained within 2 is a dielectric resonator, 3, mounted axially on a Teflon dielectric support, 4. Suspended above the dielectric resonator by a thin wire, 5, permanently attached to the cavity, 2, is a metallic block 6. This block is free to move in any direction parallel to the surface of the dielectric resonator, under the influence of an applied acceleration (force or deflection). R.F. energy is coupled in/out of the cavity 2, by way of coaxial cable, 8, terminated in a loop of wire, 7, as in the standard procedure for exciting magnetic fields in an electromagnetic cavity.

Figure 1B:
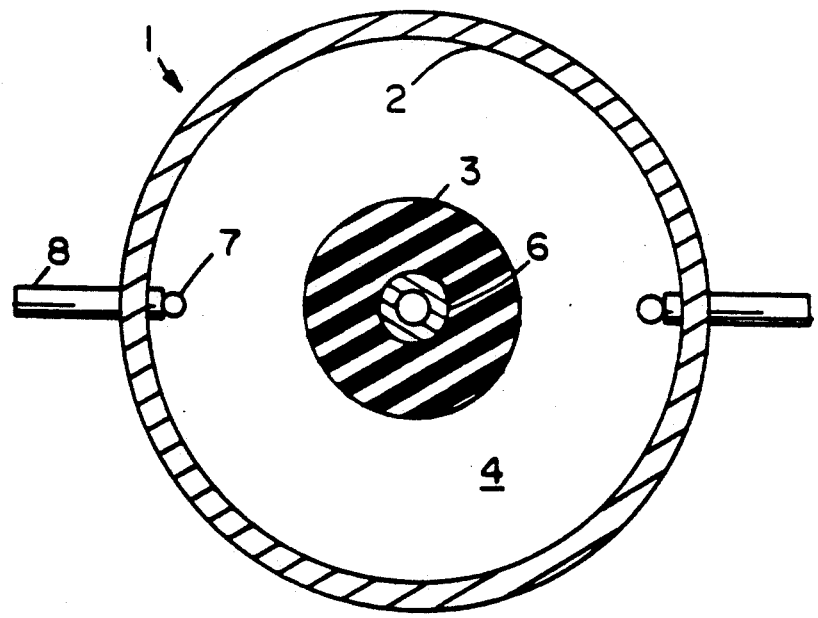

The RF energy coupled into the cavity excites certain well known discrete resonant modes associated with the geometry of the dielectric resonator. This will be described further below. The dielectric resonator is 0.505" in diameter and 0.227" in thickness and has a dielectric constant of 37. The Teflon support, 4, measures 1.5" in diameter by 0.65" thick. The overall inner dimension of the Copper cavity, 2, is 1.5" diameter by 1.5" long. The 0.141" diameter coax is located at the midpoint of the length of 2, with the coupling loops 0.1" in diameter. The loops are both oriented perpendicular to the axis of rotation of 2 as is indicated in FIG. 1b. The loops are also located as close as possible to the cavity wall, 2.

Suspended 0.015" above the center of dielectric resonator, 3, is a 0.1" diameter stainless steel block 0.1" long. This block, 6, is soldered to a copper wire, 5, 0.008" in diameter by 0.508" long. This wire, 5, is itself soldered to the cavity 2.

Upon application of acceleration (force) the block will cause the wire 5 to deflect according to characteristics of cantilever beams of cylindrical cross-section under the influence of end loads as is well known to persons of ordinary skill in this art. Because the metallic block 6 imposes certain well-defined boundary conditions on electromagnetic fields, the deflection of 6 will cause the resonant frequency of the modes associated with 3 to change in relation to the strength and orientation of the electromagnetic fields located at the position of 6. For example, an electric field oriented parallel to the lower face of block 6 will induce larger resonant frequency shifts than will an electric field oriented perpendicular to the face of the block. It is this direct relationship between the bending of the wire and the induced change in resonant frequency of the modes of 3 that affect the sensing of acceleration. It is to be noted that should one require mechanical damping of the cantilever beam assembly (5 and 6), one can use a constant magnetic field oriented such that it opposes the motion of the block 6. For that purpose, the block 6 is preferably made out of a magnetic material.

Figure 2A:
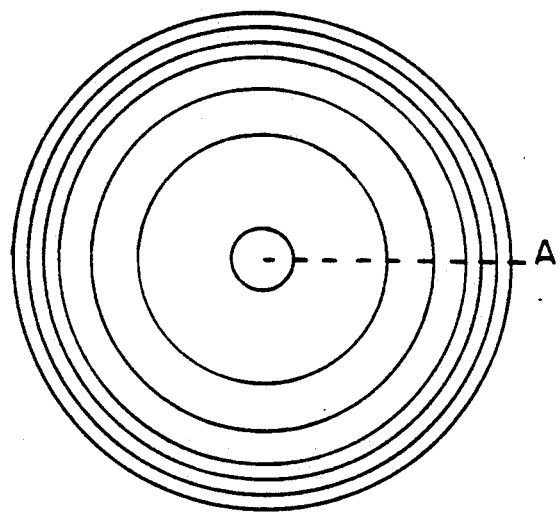
FIG. 2a is a contour plot of one of the resonant modes associated with this accelerometer.
Figure 2B:
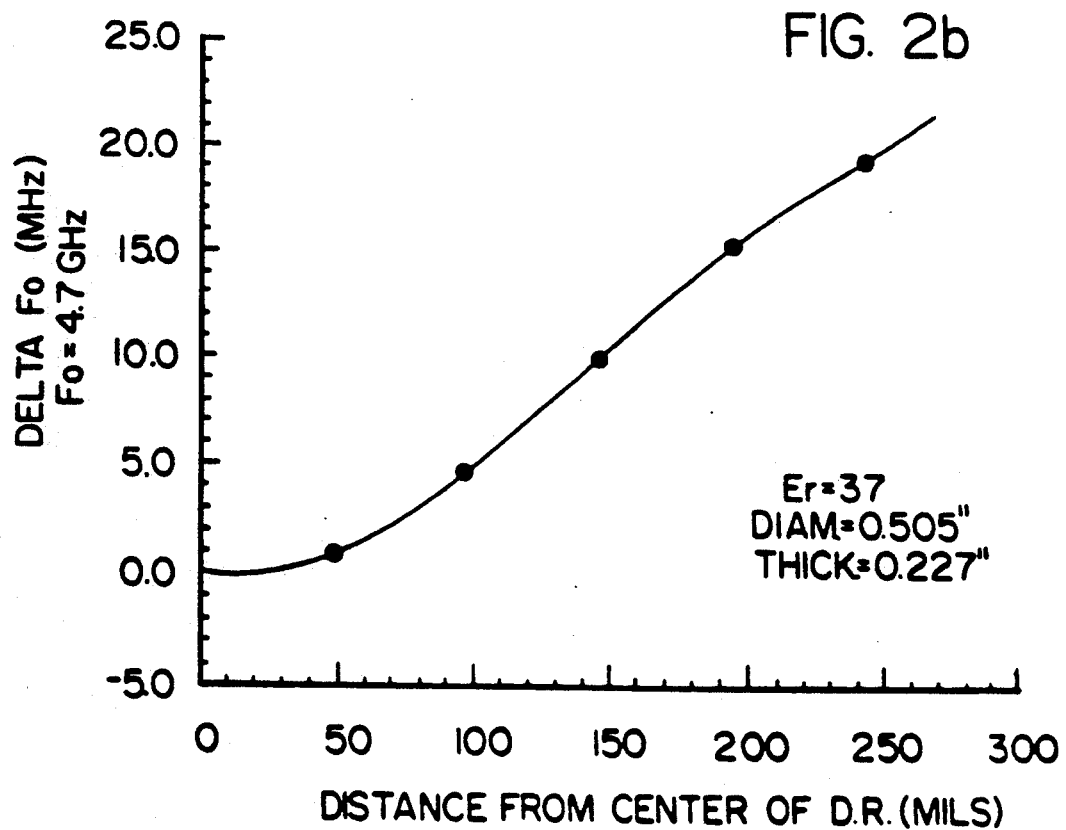

FIG. 2a is a contour plot of the change in resonant frequency of one mode of the dielectric resonator versus the position of block 6 relative to the center of the cavity. FIG. 2b shows the magnitude of this change along the path labeled "A". As depicted, this particular mode is azimuthally independent. Hence the change in frequency versus acceleration, i.e. position along any path will only indicate the magnitude of the acceleration but not the direction.

Figures 1, 3A:
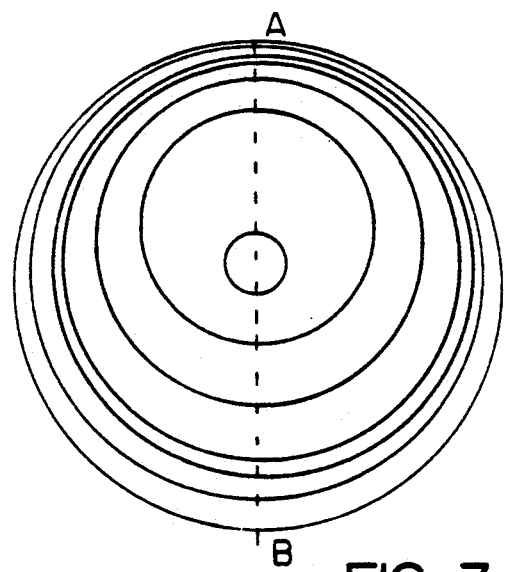
FIG. 3a-1 is a contour plot of a different resonant mode associated with the accelerometer of FIG. 3a-2.
Figures 2, 3A:
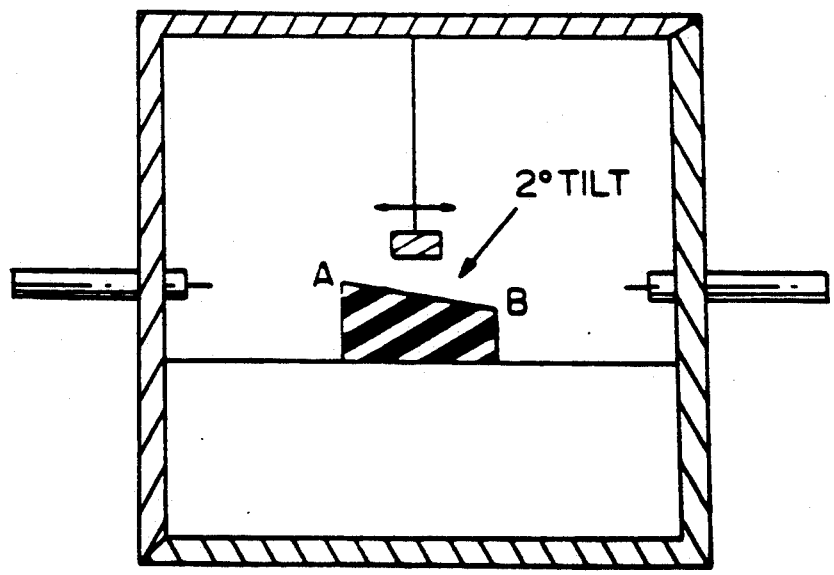
Figure 3B:
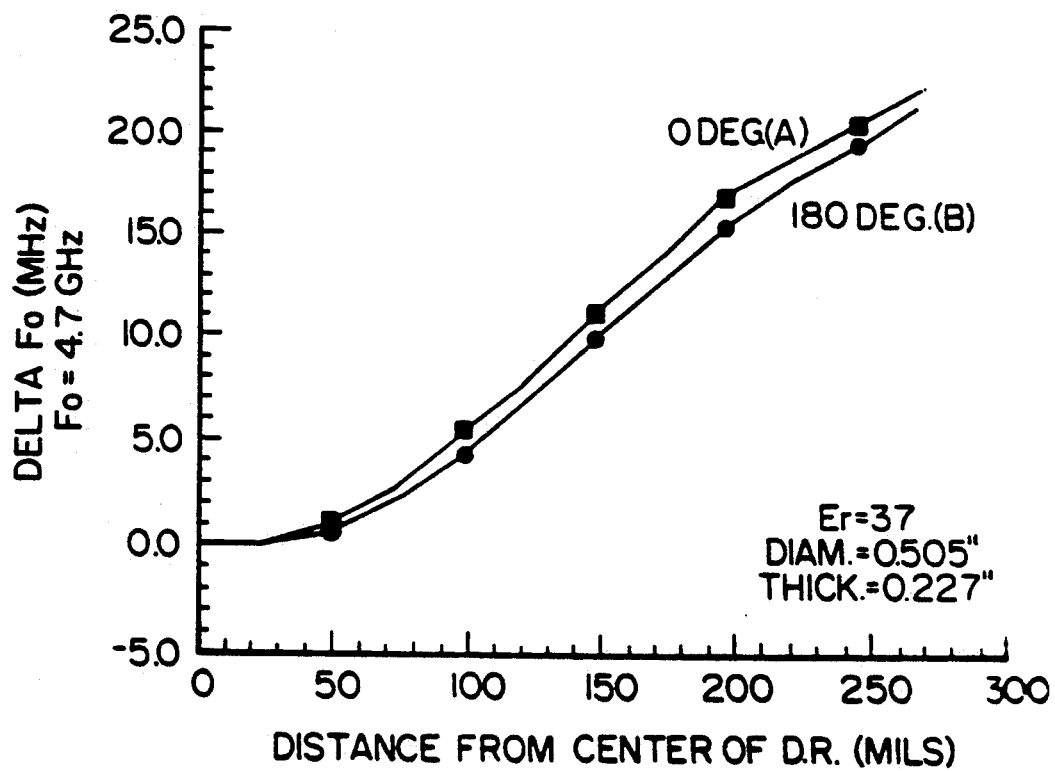

In order to sense the acceleration's direction as well as its magnitude, one has a number of options. FIG. 3a is a contour plot using the same mode as in FIG. 2a, but with the dielectric resonator tilted by 2 degrees relative to the block 6. This tilting of 3 allows the relative separation between 6 and 3 to vary in relation to the angle of tilt. The effect of this tilting is to skew the contours of FIG. 2a off center towards the location of minimum separation between 6 and 3. This is indicated in FIG. 3a. Notice path "A", the path along which minimum separation occurs, has a faster rate of change in frequency shift than does path "B". Measuring the difference in the rate of change in frequency shift of the dielectric resonator's resonance frequency indicates which path is taken. Hence, not only can the magnitude of the acceleration be determined by measuring the absolute magnitude of the frequency shift, but also the direction of the acceleration can be determined by measuring the rate of change in the frequency shift. This sensing of direction is also indicated in FIG. 3b by the differing slope of the curves.

One can also sense the acceleration's magnitude and direction by simply looking at an altogether different resonant mode without resorting to tilting the actual dielectric resonator. FIG. 4a and 4b show an azimuthally dependent mode whereby the absolute frequency change versus applied acceleration (i.e. deflection of 6) is dependent on direction. Once again, measuring absolute frequency shift and rate of change in frequency shift will indicate both magnitude and direction of the applied acceleration.

If one wanted to measure acceleration in three dimensions, one could simply replace the wire 5 with a coiled spring. The spring would allow free movement of the block 6 in the axial direction, as well as radially and azimuthally. Then the same principles and resonant modes could be used, as outlined above, to sense the acceleration as a true vector in three dimensions.

The same apparatus will measure displacements of the mass which may be caused other than by accelerations of the overall apparatus. For example, the displacement may be caused by contact with a rod connecting to a membrane that is deflected by changes in pressure of a medium in which case the device may function as a pressure transducer. The fact that the entire displacement vector (or at least more than one component) may be determined allows the invention to correct for any deviation of the direction of the displacement of the membrane from the direction perpendicular to the membrane surface. In effect, the apparatus is a stress transducer that is capable of determining pressure to high accuracy from the components of the stress.

Figure 5:
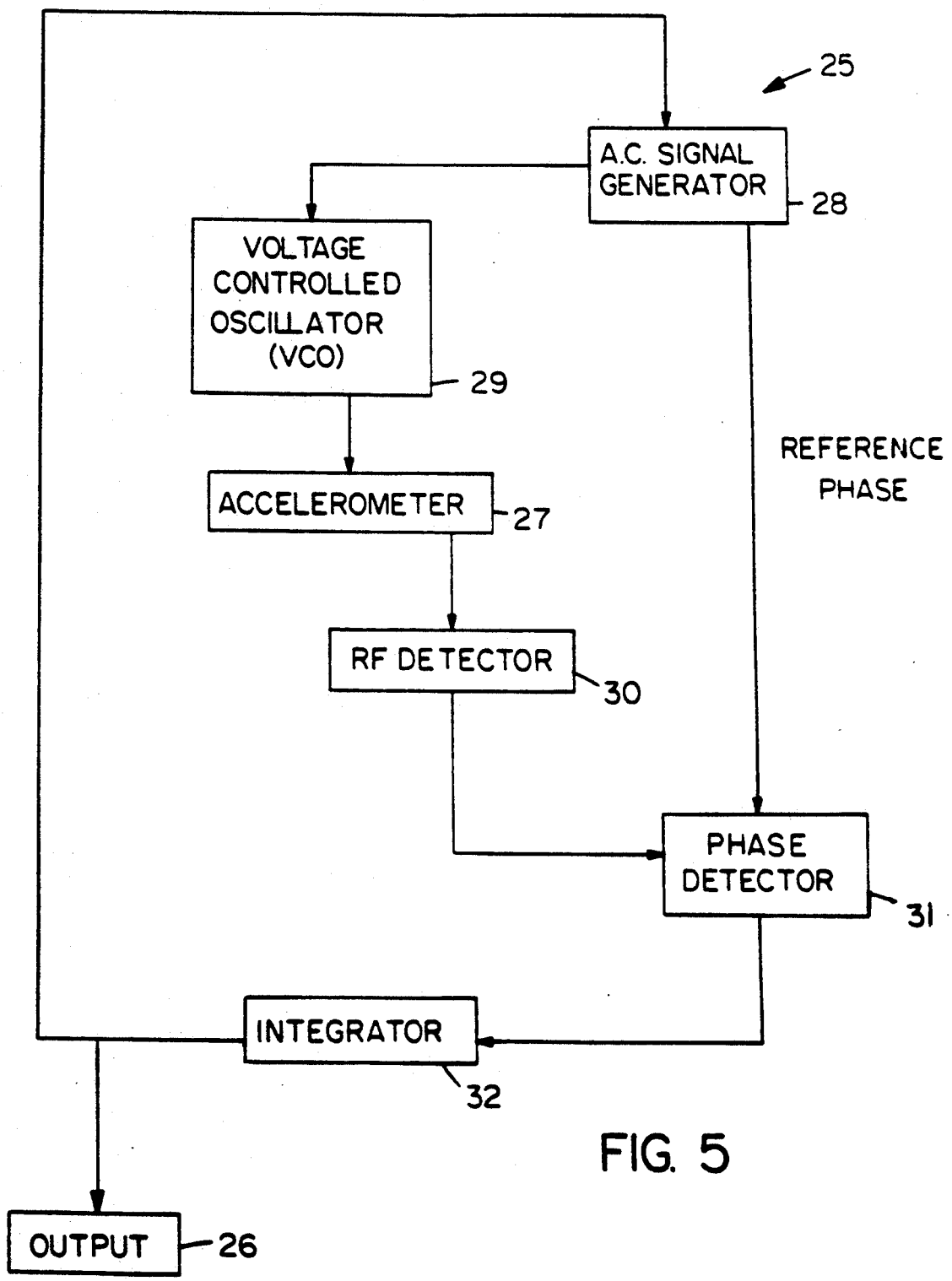
FIG. 5 is a block diagram of a stand alone system incorporating the use of this invention.

As shown in FIG. 5, the present invention may be implemented by having a phase detector 31 which receives input from both an AC signal generator 28 that provides a reference phase and an RF detector 30. The RF detector in turn receives the output of the accelerometer of the present invention, driven by a voltage controlled oscillator 29. The phase detector signal is accumulated by the integrator 32 and passed to the output 26, and recursively supplied to the input device.

The present invention is not limited by the details of the described preferred embodiment, but encompasses other uses and properties as defined by the following claims.

I claim:

1. A microwave resonant cavity bidirectional acceleration transducer adapted to undergo an acceleration having vector components, said acceleration transducer comprising an electrically conductive hollow cavity formed by cavity walls of pre-determined geometry, a dielectric resonator within said cavity, said dielectric resonator having RF electromagnetic normal modes, RF energy input means within said cavity and adapted to excite pre-determined discrete resonant modes of said dielectric resonator, output signal means interfacing with said dielectric resonator, said output signal means providing electronic output signals dependant upon the resonant frequency of pre-determined normal modes of the said dielectric resonator, a dielectric or conductive mass attached by an elastic medium at a first position fixed with respect to a portion of said cavity walls and adapted to move by a displacement vector from a first position near said dielectric resonator, to a second position, said displacement vector being the vector difference between said first and second position, wherein one or more of said resonant frequencies of pre-determined normal modes varies in response to said displacement vector, vector logic electronics adapted to determine from said electronic output signals components of said acceleration vector and to provide a signal representative of said components of said acceleration vector, wherein said vector logic determines the magnitude and direction of the acceleration vector.

2. The microwave resonant cavity bidirectional acceleration transducer of claim 1, wherein said acceleration is only within a predetermined plane.

3. The microwave resonant cavity bidirectional acceleration transducer of claim 2 wherein said vector logic electronics is adapted to receive said electronic output signals and to determine from said signals the frequency shift values of one or more pre-determined normal modes of said dielectric resonator, and wherein said vector logic electronics determines one or more components of said acceleration vector from said frequency shift values.

4. The microwave resonant cavity bidirectional acceleration transducer of claim 1 wherein said vector logic electronics is adapted to receive said electronic output signals and to determine from said signals the frequency shift values of one or more pre-determined normal modes of said dielectric resonator, wherein said vector logic electronics determines one or more components of said acceleration vector from said frequency shift values.

* * * * *